United States Patent [19]
Bourne

[11] Patent Number: 6,165,021
[45] Date of Patent: *Dec. 26, 2000

[54] CONNECTOR FOR A SMART CARD READER APPARATUS AND CARD READER COMPRISING SAME

[75] Inventor: Frédéric Bourne, Neuilly-sur-Seine, France

[73] Assignee: Framatome Connectors International, France

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/875,694

[22] PCT Filed: Jan. 30, 1996

[86] PCT No.: PCT/FR96/00156

§ 371 Date: Nov. 4, 1997

§ 102(e) Date: Nov. 4, 1997

[87] PCT Pub. No.: WO96/24111

PCT Pub. Date: Aug. 8, 1996

[30] Foreign Application Priority Data

Feb. 3, 1995 [FR] France ................... 95 01271

[51] Int. Cl.[7] .................................................. H01R 24/00
[52] U.S. Cl. .......................................... 439/630; 235/441
[58] Field of Search ............................ 235/441; 439/630, 439/438, 488, 489

[56] References Cited

U.S. PATENT DOCUMENTS

| | | | |
|---|---|---|---|
| 4,675,516 | 6/1987 | Guion | 235/441 |
| 4,900,272 | 2/1990 | Lange et al. | 439/630 |
| 5,161,992 | 11/1992 | Birch | 439/260 |
| 5,969,329 | 10/1999 | Vallet | 235/475 |

*Primary Examiner*—Renee Luebke
*Assistant Examiner*—Briggitte R. Hammond
*Attorney, Agent, or Firm*—Pollock, Vande, Sande & Amernick, R.L.L.P.

[57] ABSTRACT

A connector for an apparatus for reading smart cards has a body supporting brush contact elements for electronically contacting the conductive pads of a chip on a card inserted into the connector. The connector includes an electronic circuit connected to at least some of the brush contact elements and connectable to the electronic circuit of the card reader. The electronic circuit on the connector controls the insertion of the card into the card reader and its withdrawal therefrom.

9 Claims, 4 Drawing Sheets

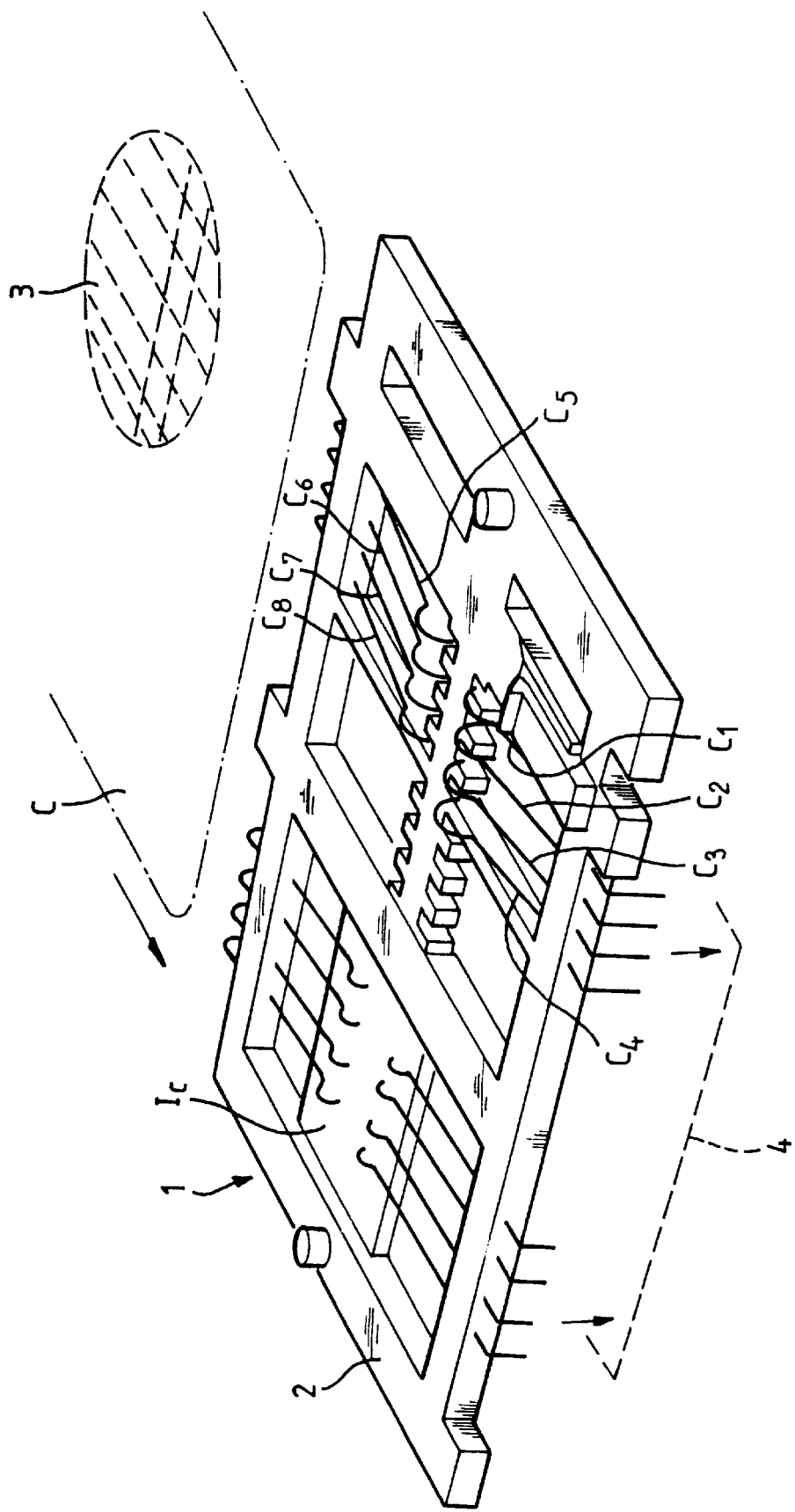
FIG_1

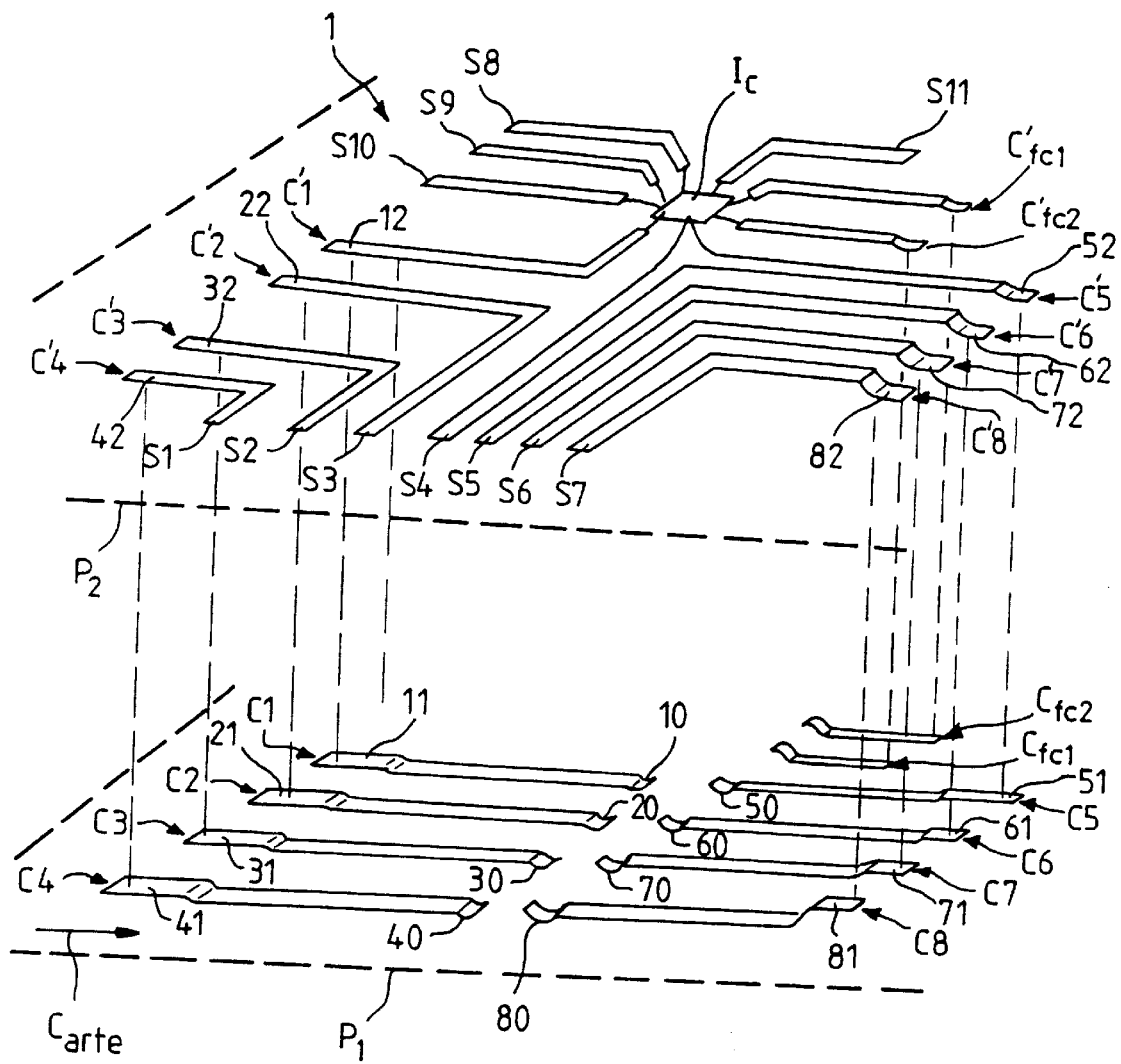
FIG_2

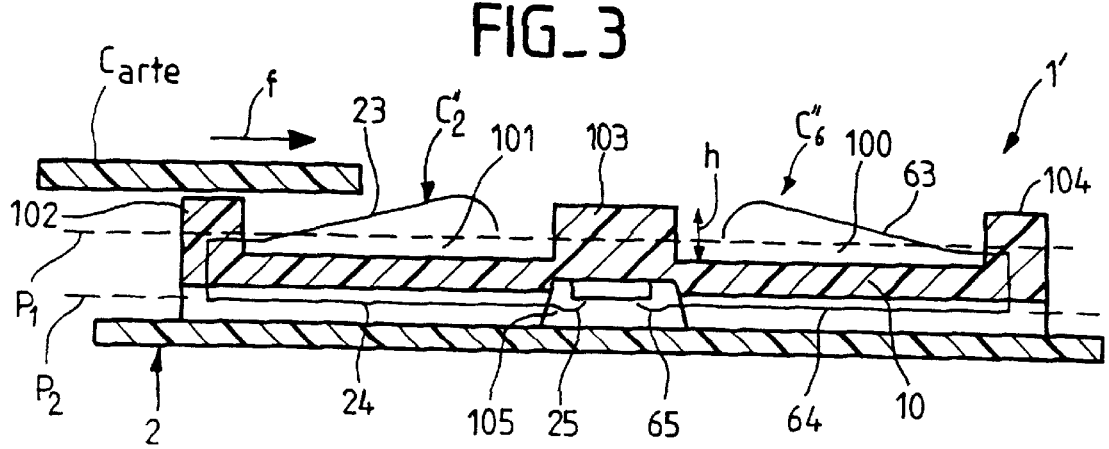
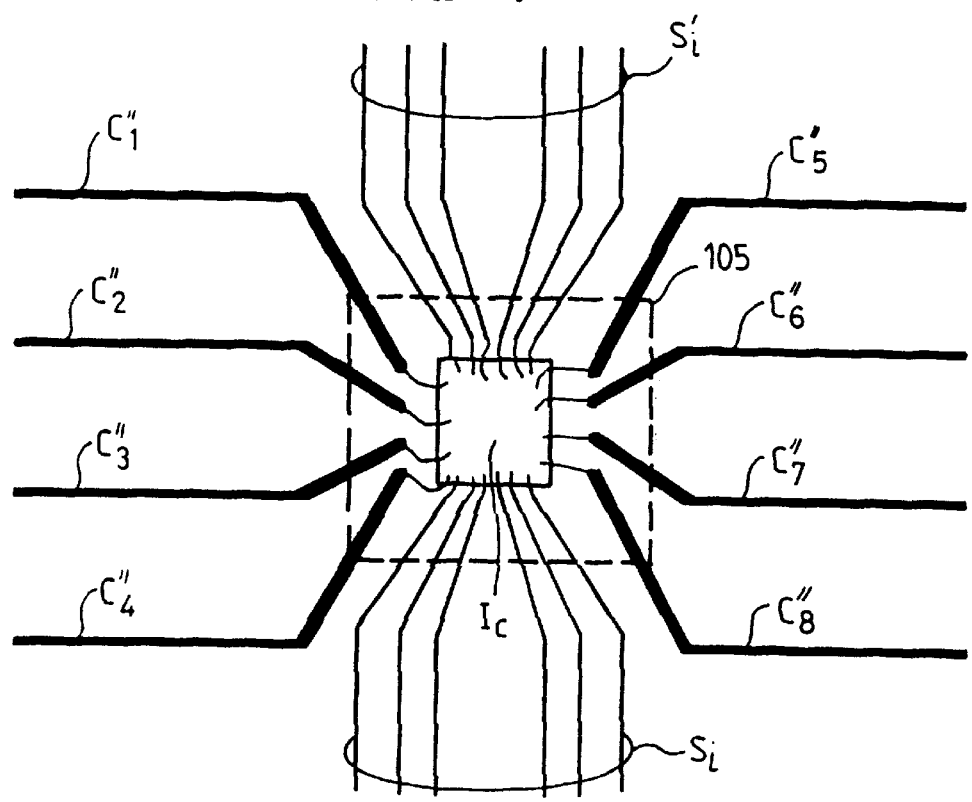

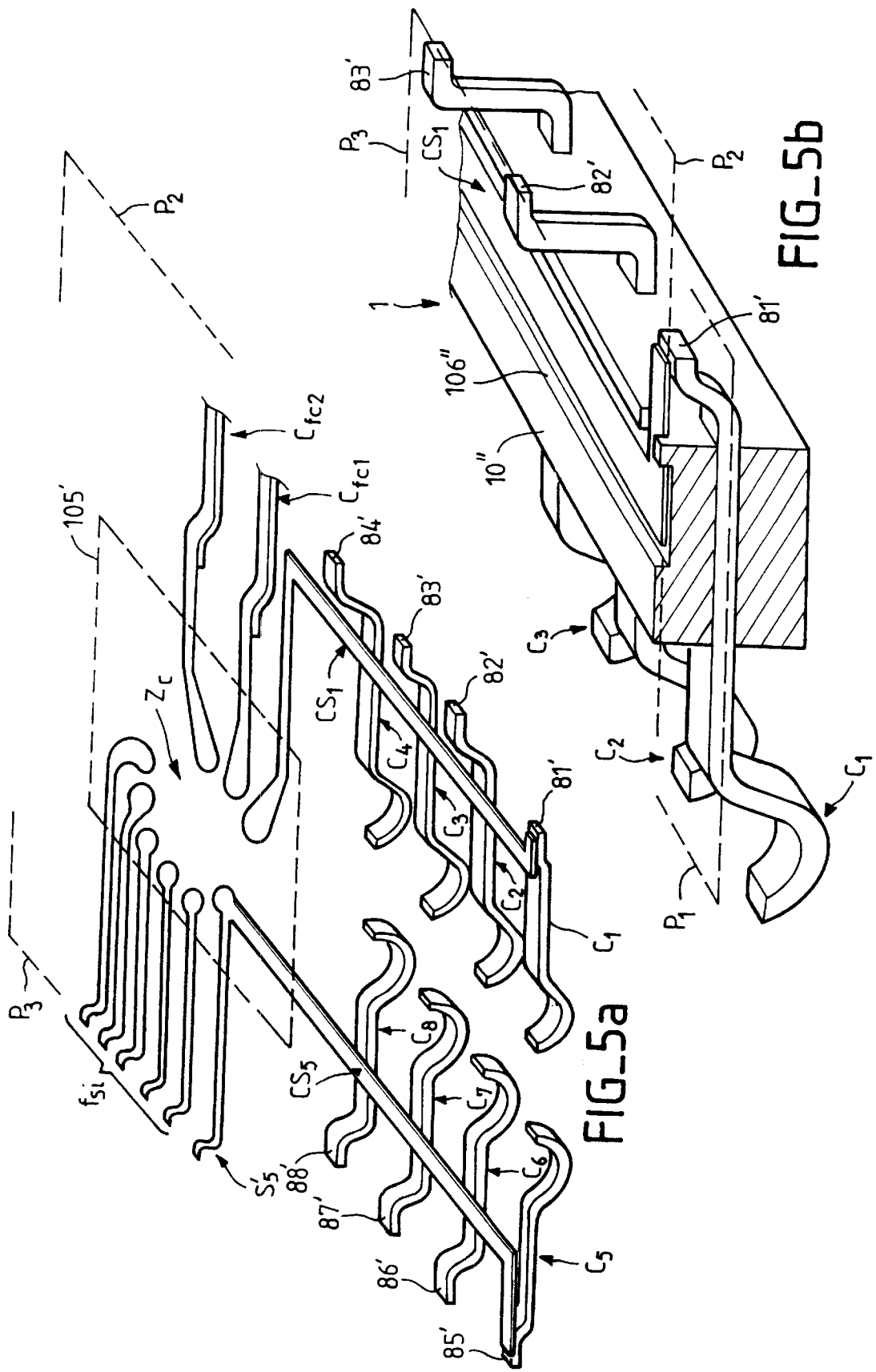

6,165,021

CONNECTOR FOR A SMART CARD READER APPARATUS AND CARD READER COMPRISING SAME

This application is a Continued Prosecution Application filed on Nov. 4, 1997.

FIELD OF THE INVENTION

The invention concerns a connector for a smart card reader apparatus.

The invention also concerns a smart card reader apparatus comprising a connector of this kind.

BACKGROUND OF THE INVENTION

In the context of the invention, "card" means all cards incorporating a hybrid or monolithic integrated circuit or "chip". They are, for example, cards in the "credit card" format still called "memory cards". The microcircuit of the card usually comprises a microprocessor or a microcontroller including memory circuits, for example of the "PROM" type. This type of card is designed to be inserted into special devices for reading and/or writing data. For simplicity, these devices are called "readers" hereinafter, although they can naturally write data and assure other ancillary functions (electrical power supply, testing, etc.). The data is generally stored in the aforementioned memory circuits in encrypted form. It is therefore read from memory locations or written to memory locations.

In all cases there are input-output members consisting of contact areas flush with the surface of one of the main faces of the card. Various standards define the position of these contact areas. They are used not only for the aforementioned data inputs-outputs but also for supplying electrical power to the microcircuit and for carrying out various checks, depending on the application concerned (presence test, etc.). The reader includes brush contacts that make galvanic contact with the aforementioned areas when the card is correctly inserted into a connector provided for this purpose.

In this application, a number of problems have to be solved simultaneously, including:

1. The microcircuit of the card must be powered up only if the brush contacts are correctly positioned on the contact areas of the card. Powering up when incorrectly positioned not only prevents operation of the reader system but can damage the electronic circuits of the microcircuit.
2. In particular, the brushes for the data signals must be in position before the power supply voltage is applied to the microcircuit.
3. The user may withdraw the card during processing (this is known as "pull-out"). It is then necessary for the reader to react very quickly to cut off the power supply before the brushes reach prohibited positions (i.e., positions that are hazardous to the integrity of the circuits of the microcircuit).
4. The use of any non-standard object, for example an electrically conductive plate or a faked card, whether by accident or in the case of attempted fraud, can also cause faults.

In all these cases it is necessary to disable the reader and to interrupt the electrical power supply to limit the risk of damage to the circuits and/or of attempted fraud.

There are many reader systems aimed at reducing some or all of these problems. They can be classified into three major categories.

The first category comprises electronic detector systems.

In systems of this type, before applying an electrical voltage to the microcircuit, an electrical test is carried out, for example by measuring the resistance between the brush contacts. If these tests do not yield expected values within a given range, the card has been inserted incorrectly or a foreign body has been inserted in its place.

This type of system has various drawbacks,

In these systems, the card is positioned against an abutment before it comes into contact with the brushes. Contact is made by relative displacement of the card towards the brushes perpendicularly to the surface of the card (main faces).

Security can be assured only by correct operation of the mechanical parts of the system. However, the latter can be backed up by an "end of travel" contact which disables the power up sequence if the card is not in the correct position. A power up sequence can be established by the height of the brushes or by initializing the electronics on the closing of a "card present" contact. A system of this kind is described in EP 0 139 593, for example. The above patent describes a smart card reader apparatus comprising:

a connector including a body supporting brush contact members designed to come into electrical contact with conductive areas associated with said microcircuit of said card when the latter is inserted into the connector; and an integrated circuit including means for monitoring inserting the card into the card reader and withdrawing it therefrom, said circuit being connected, on the one hand, to at least some of said brush contact members and, on the other hand, to this electronic circuit of the card reader.

The main disadvantage of this system is the fact that the mechanical arrangements required to implement the aforementioned functions are complex and costly.

The third category comprises systems with brush contacts and an "end of travel" contact. A system of this kind is disclosed in FR-A-2 623 314, for example.

In these systems, the connectors into which the cards are inserted are provided with an "end of travel" contact which initiates the powering up of the microcircuit when the card is in the correct position.

The mechanical arrangements are simple and of low cost but have the disadvantage of requiring the incorporation into the reader electronics of control circuits associated with the aforementioned "end of travel" contact.

Additionally, there are drawbacks common to more than one system.

In the case of electronic detector systems and systems using "end of travel" contacts, functions associated with the position of the card have to be implemented in the electronics of the reader, and therefore allowed for in the design of each application.

For reasons of speed of development and reduction of costs, reader apparatus designers usually employ microprocessor-based systems. These naturally have good flexibility since it is sufficient to modify the program if the characteristics of a given application change for any reason. However, it is well known that programmed logic is slower then hardwired logic executing the same functions.

SUMMARY OF THE INVENTION

It is an object of the invention is to provide a solution to the problems mentioned above that alleviates the drawbacks of the prior art systems.

In accordance with the invention, the connector for apparatus for reading smart cards including a body supporting brush contact members designed to come into electrical contact with conductive areas associated with said microcircuit of the card when the latter is inserted into the connector; at least some of the brush contact members are connected to an electronic circuit including means for monitoring inserting the card into the card reader and withdrawing it therefrom, the circuit being connected, to the electronic circuit of the card reader. The connector including means for monitoring inserting the card into the card reader and withdrawing it therefrom.

The invention also consists in a card reader apparatus including a connector of the above kind.

Accordingly, the connector of the invention, and not the reader, carries an electronic circuit for monitoring insertion of the card into the card reader and withdrawal it therefrom.

This simplifies the construction of the card reader. The latter can be connected to different connectors each incorporating an integrated electronic circuit for monitoring the insertion of different kinds of smart card.

BRIEF DESCRIPTION OF THE DRAWINGS

The invention will be better understood and other features and advantages of the invention will emerge from a reading of the following description with reference to the accompanying drawings, in which:

FIG. 1 is a perspective view of a connector in accordance with the invention, a smart card and, in schematic form, the electronic circuit to which the connector is designed to be connected, FIG. 2 is a schematic exploded view of one example of a connector for a smart card reader apparatus, FIG. 3 is a schematic longitudinal section of one example of a connector for a smart card reader apparatus constituting a different embodiment of the invention;

FIG. 4 is a top view of the disposition of a dedicated integrated circuit used in this other embodiment of a connector in accordance with the invention, FIG. 5a is a schematic exploded view of one example of a connector for a smart card reader apparatus in accordance with the embodiment of the invention shown in FIG. 1;

FIG. 5b is a fragmentary sectional view of this connector.

DESCRIPTION OF PREFERRED EMBODIMENT

In the FIG. 1 embodiment, the connector 1 for apparatus for reading a card C incorporating a microcircuit 3 has a body 2 supporting brush contacts $C_1$ through $C_8$ designed to come into electrical contact with associated conductive areas of said microcircuit $I_C$ when the card C is inserted in the connector 1.

In accordance with the invention, the connector 1 includes an electronic circuit $I_C$ connected to at least some of said brush contacts $C_1$ through $C_8$ and to the electronic circuit 4 of the card reader. The electronic circuit $I_C$ carried by the connector 1 includes means to be described in detail below for monitoring by inserting the card C into the card reader and removing it therefrom.

FIG. 2 is a schematic exploded view of a connector 1 constituting one embodiment of the invention. To be more precise, this figure shows only the arrangements concerning the various contact members of the connector.

In accordance with one essential feature of the invention, an integrated circuit $I_C$ is incorporated into the connector 1 itself, namely, in a housing formed within the thickness of the insulation of the connector frame (not shown).

The connector comprises two sets of contact members.

A first set, located substantially in a first plane $P_1$, which is a lower plane in FIG. 2, comprises a series of pairs of brush contacts, four such pairs $C_1$ through $C_8$ in the example shown. These brush contacts $C_1$ through $C_8$ are parallel flexible blades facing first ends 10 through 80 of which are curved and are adapted to come into contact with corresponding contact areas (not shown) of the smart card, symbolized by the arrow C, after insertion of the latter into the connector 1. The first set of contacts advantageously further comprises a pair of "end of travel" contacts $C_{fc1}$ and $C_{fc2}$.

In the example shown, the brushes are allocated as follows:

contact member $C_1$: power supply voltage;

contact member $C_5$: ground;

contact members $C_2$ through $C_4$ and $C_6$ through $C_8$: "signal" brush contacts (inputs and/or outputs).

In themselves, these arrangements are known from the prior art.

The connector 1 comprises a second set of contact members $C'_1$ through $C'_8$, $C'_{fc1}$–$C'_{fc2}$ and $S_1$ through $S_{11}$ disposed in a second plane $P_2$, which is above and substantially parallel to the first in the figure. This set of contact members $C'_1$ through $C'_8$, $C'_{fc1}$–$C'_{fc2}$ and $S_1$ through $S_{11}$ is connected between the brush contact members $C_1$ through $C_8$, the input-outputs of the microcircuit $I_C$ and the electronic circuit of the smart card reader apparatus (not shown).

The above connector is generally mounted on a printed circuit supporting the electronics of the reader, for example, by soldering input-output pins into plated-through holes in the printed circuit. The electrical connections between the second set of contact members and these electronic circuits are therefore made by conductive tracks connected to the plated-through holes and to the electronic circuits of the reader apparatus.

The contact members of the second set are of three types, depending on their respective connections:

A first type, $C'_2$ through $C'_8$ (in the example shown) establishes a direct connection between the brush contact members of the connector 1 and the electronics of the reader apparatus via the aforementioned printed circuit. These are generally some or all of the "signal" brush contact members (i.e. $C_2$ through $C_4$ and $C_6$ through $C_8$) in the example shown. In contrast to what is shown in FIG. 2, the "ground" brush contact member $C_5$ could be connected in this way to the electronics of the reader apparatus.

A second type, $C'_{fc1}$–$C'_{fc2}$, $C_1$ (in the example shown) establishes a connection between the brush contact members of the connector and some input-outputs of the integrated circuit $I_C$. These are auxiliary contacts, generally the "end of travel" brush contact members $C_{fc1}$ and $C_{fc2}$, the power supply voltage brush contact member $C_1$ and possibly some "signal" brush contact members or the "ground" brush contact member $C_5$.

Finally, a third type, $S_4$ and $S_8$ through $S_{11}$, connects the outputs and/or inputs of the integrated circuit $I_C$ directly to the electronic circuits of the reader apparatus via the aforementioned printed circuit. One of the above contact members conveys the electrical power supply, which passes via the integrated circuit $I_C$.

In the particular hardware configuration shown in FIG. 2, to facilitate manufacture of the connector 1, the contact members $C'_2$ through $C'_4$ and $C'_5$ through $C'_8$ of the top set are extended by respective elongate contact members $S_3$ through $S_1$ and $S_4$ through $S_7$ that are substantially parallel to each other and orthogonal to the direction of the contact members $C'_2$ through $C'_4$ and $C'_5$ through $C'_8$.

Whichever solution is adopted for the "ground" brush contact member $C_5$ (direct connection or otherwise), the integrated circuit $I_C$ naturally includes a connection connected to ground, i.e., $C_5$–$S_4$ (in the example shown).

To show more clearly the disposition of the contact members of the two sets, the distance between the planes $P_1$ and $P_2$ has been exaggerated. In practice, the two sets are in planes $P_1$ and $P_2$ that are only a small distance apart so that the second ends 11 through 81 of the brush contact members $C_1$ through $C_8$ opposite the first ends 10 through 80 are in galvanic contact with the ends 12 through 82 in face-to-face relationship with the corresponding contact members of the top set $C'_1$ through $C'_8$. The same applies to the facing ends of the "end of travel" contact members $C_{fc1}$–$C_{fc2}$, on the one hand, and $C'_{fc1}$–$C'_{fc2}$, on the other hand.

The facing ends of the contact members can be welded.

The standard wire soldering technique can be used to establish the connections with the inputs-outputs of the integrated circuit $I_C$.

The integrated circuit is designed and manufactured using standard techniques for development of dedicated integrated circuits. The expression "integrated circuit" is to be understood as including monolithic integrated circuits and hybrid circuits.

The main functions executed by the integrated circuit $I_C$ are as follows:

scanning the status of the "end of travel" pair of contacts $C_{fc2}$—$C_{fc2}$;

controlling powering up and powering down of the microcircuit of the card $C_{ard}$, in accordance with the aforementioned status; the switch function is integrated into the circuit $I_C$;

possibly test functions of various electrical characteristics between brush contact members: for example, the resistance or the impedance between two brush contact members or the response to a pulse signal;

possible integration of certain standard data transmission functions.

Existing large scale integration techniques allow integration of additional functions, such as functions relating to use of the smart card C.

By means of the integrated circuit $I_C$, it is also possible to implement in the connector 1 all the logic functions of the reader apparatus, the electronics external to the connector being limited in this case to the input-output units.

It is then possible to propose, as active components, connectors of various designs differing essentially in the capacity (functionality) of the integrated circuit.

FIG. 3 shows, in section, a different embodiment of the connector 1'. This figure shows the hardware configuration of the body 10 of the connector.

Only one pair of brush contact members $C''_2$–$C''_6$ can be seen in FIG. 3, functionally equivalent to the pair $C_2$–$C_6$ in FIG. 2. Nevertheless, there is the same number of pairs of brushes for a given type of card C. The same goes for the pairs of "end of travel" contacts (not shown in FIG. 3).

The electrically insulative material body 10 of the connector 1' is conventionally supported by a printed circuit 4 carrying the electronics of the reader apparatus (not shown). Facing upwards (in the example shown), it comprises two cavities 100 and 101 on respective opposite sides of a central raised portion 103. The brush contact members $C''_2$ and $C''_3$, for example, are disposed in these cavities 100 and 101, or, to be more precise, in their respective upper parts 23 and 63. In this embodiment, the brush contact members are elongate in shape and are bent on themselves so that they are embedded in particular areas of the body 10 of the connector 1' and lead into an internal cavity 105 containing the integrated circuit $I_C$. This advantageously enables the appropriate inputs-outputs of the integrated circuit $I_C$ to be connected directly to the brush contact members without using intermediary contacts (like the contact $C'_1$ or $C'_2$ in FIG. 2).

All the brush contact members can be connected via the integrated circuit $I_C$ even if this is functionally necessary for only some of the brush contact members. It is then sufficient to provide appropriate internal connections.

Lateral rims 102 and 104 flank the cavities 101 and 100, respectively. The combination defines a frame over which the card C slides when it is inserted into the reader (arrow f). The raised central portion 103 advantageously has the same height h as the lateral rims to facilitate guidance of the card C. The ends of the brush contact members $C''_2$ and $C''_6$ opposite their free ends are embedded in these lateral rims 102 and 104, which lock them in a position inclined slightly upwards relative to the plane $P_1$. Consequently, because of the elasticity of the material of which they are made, the free parts of the contacts act as springs rubbing on the bottom face of the card, which carries the contact areas of the microcircuit (not shown). The brushes are bent within the thickness of the lateral rims, as previously indicated. They then extend in a substantially vertical direction (in the figure) and are bent a second time (plane $P_2$) to terminate in the central cavity 105: parts 24 and 64.

FIG. 4 shows the wiring of the integrated circuit $I_C$. This is shown in its cavity 105, as seen from above relative to FIG. 3. In this example, the brushes all terminate in the cavity 105, on the left in the case of the brushes $C''_1$ through $C''_4$ and on the right in the case of the brushes $C''_5$ through $C''_8$, and are connected to inputs-outputs of the integrated circuit $I_C$.

Respective groups of contact members $S_i$ and $S'_i$ also connected to input-outputs of the integrated circuit $I_C$ are also shown at the bottom and at the top of FIG. 4. These contact members have a function similar to the contact members $S_1$ through $S_{11}$ in FIG. 2. They are connected via the printed circuit 4 to the electronic circuits of the reader (not shown).

The foregoing description assumes that the semiconductor chip $I_C$ is "naked", the contact members replacing the input-output pins. This also assumes that, once the connections have been made between the contact members and the inputs-outputs of the chip $I_C$, it is necessary to carry out specific encapsulation operations to protect the chip. As an alternative, the chip can be mounted in a standard "ISO" package which is installed in the cavity 105 of the body 10 of the connector 1'. This avoids the specific connection and encapsulation operations.

FIG. 5a shows another embodiment of a connector 1" of the invention.

In this embodiment, the area 105" in which the integrated circuit ($I_C$) is located is offset laterally relative to the pairs of contacts $C_1$ through $C_8$. As will be shown below, this arrangement allows the use of a single assembly frame. The contact areas to be connected to the inputs/outputs of the integrated circuit $I_C$ are in a plane coincident with the plane $P_2$, as previously defined. As already described, they are connected directly to the electronic circuits of the reader, or to the pair of ends of travel contacts $C_{fc1}$–$C_{fc2}$, or to ground and to the corresponding brush $C_5$, or to the power supply brush $C_1$ (and possibly to some signal brushes in an embodiment that is not described). The group of direct connections to the electronic circuits of the reader is designated $f_{Si}$. The ground connection to the reader is designated $S'_5$. The rear ends 82' through 84' and 86' through 88' of the signal brushes (not connected to inputs/outputs of the integrated circuit) $C_2$ through $C_4$ and $C_6$ through $C_8$ are raised and bent into a flattened S-shape curve so as to be flush with a plane $P_3$ at a higher level (in FIG. 5a) than the plane $P_2$. Likewise the ends of the group of connections $f_{Si}$ are flush with the plane $P_3$ and the end of $S'_5$ (ground connection). On the other hand, the ends of the power supply brush $C_1$ and the ground brush $C_5$ are raised and curved but are substantially flush with the plane $P_2$. This arrangement allows the appropriate areas of the circuit $I_C$ to be connected via conductive blades $CS_1$ and $CS_5$ to brushes $C_1$ and $C_5$, respectively. These blades are in the plane $P_2$.

FIG. 5b shows, partly in section and in more detail, the arrangement of the brushes and the blades $CS_1$ and $CS_2$ previously mentioned in the body 10" of the connector 1". The fragment shown includes the three brushes $C_1$, $C_2$ and $C_3$ and the conductive blade $CS_1$. The latter is disposed in a groove 106" orthogonal to the blades constituting the brushes. Note that the ends 82' and 83' are flush with the plane $P_3$ whereas the end 81' is just below the plane $P_2$, so as to be connected to the blade $CS_1$.

All the ends of the connections of the group $f_{Si}$, the ground connection $S'_5$ and all the ends of the "signal" brushes, i.e., the brushes not connected directly to the inputs-outputs of the integrated circuit or to the contact areas of the circuit $I_C$, can be soldered directly (in the plane $P_3$). It has been assumed that the signals generated by the pair of "end of travel" contacts $C_{fc1}$–$C_{fc2}$ pass through the integrated circuit to be processed therein. The ends of this contact pair are therefore also substantially flush with the plane $P_2$ so that they can be connected to two contact areas of the circuit $I_C$.

As previously, the flexible blades forming the brushes are substantially in the plane $P_1$ over the greater part of their length.

The above description shows that the circuit $I_C$ provides the interface between at least some of the contact members (brushes, "end of travel" contacts, etc) habitually used in prior art connectors and the electronics of the reader. In other words, the functions relating to monitoring the insertion, withdrawal and correct positioning of the card C are "transparent" to this electronics. In particular, it is sufficient to provide a power supply to the microcircuit of the card via the contact members $S_1$ through $S_{11}$ which power supply is also used for the integrated circuit $I_C$. Once the card C has been inserted correctly, or more generally when the rules of normal operation are complied with (no "pull-out" condition, attempted fraud, etc.), the electronic circuits of the reader send and/or receive the usual signals for this type of application.

Of the various advantages previously stated, the most important is that the designer of a particular application using a card reader does not have to consider the above functions. It is sufficient for the designer to select a connector, possibly of a particular model, offering particular functions and constituting an active component.

The invention finds applications in many fields: bank and credit cards, telephone cards, "electronic wallet", tolls, timekeeping, access (security).

I claim:

1. An electrical connector for a smart card reader for reading a smart card which includes a microcircuit, said connector including and carrying an electronic circuit, a body supporting brush contact members designed to come into electrical contact with conductive areas associated with the microcircuit of the card when the latter is inserted into the connector, wherein at least some of the brush contact members being connected to the electronic circuit include means for monitoring insertion of said card into the card reader and withdrawal of said card from said card reader, said electronic circuit of said connector being connected to the electronic circuit of the card.

2. The electrical connector according to claim 1, including additional contact members adapted to be connected to the electronic circuit of the card reader, wherein the electronic circuit carried by the body of the connector is connected to at least some of said additional contact members.

3. The electrical connector according to claim 1, wherein said electronic circuit is an integrated circuit chip and inputs-outputs of said chip are connected directly to brush contact members and inputs-outputs of said chip are connected directly to said additional contact members at a second end.

4. The electrical connector according to claim 3, wherein at least some of said brush contact members are connected directly to at least some of said additional contact members at a second end without passing through the inputs-outputs of said chip.

5. The electrical connector according to claim 1, further comprising "end of travel" detector contact members for detecting correct insertion of the card into the connector.

6. The electrical connector according to claim 5, wherein said "end of travel" detector contact members are connected to additional contact members in turn connected directly to inputs-outputs of said chip so that the status of these "end of travel" detector contact members is monitored by said electronic circuit.

7. The electrical connector according to claim 6, wherein one of said brush contact members is adapted to carry an electrical power supply of said microcircuit, said electronic circuit receives the power supply via one of said additional contact members, said electronic circuit includes an integrated switch function, and the power supply of the member is effected under a control of said integrated switch function when the electronic circuit detects a status of said "end of travel" detector contact members indicating that the card is correctly inserted and cutting off this power supply otherwise, so as to control powering up and powering down of the microcircuit of said card.

8. The electrical connector according to claim 1, wherein said body is made of an electrically insulative material and incorporates two open cavities in which said brush contact members are disposed and rims forming a frame guiding insertion of said card.

9. The electrical connector according to claim 8, wherein said brush contact members each comprise a blade forming a spring in an area covering said cavities so as to rub on said conductive areas carried by said microcircuit when the card is inserted into the connector, said blades being captive in said rims and extended by curved parts leading into a cavity of the body in which an integrated circuit chip is housed so that said blades can be connected to inputs-outputs of that chip.

* * * * *